(12) United States Patent
Kirchner et al.

(10) Patent No.: US 10,303,040 B2
(45) Date of Patent: May 28, 2019

(54) INTEGRATED WAVELENGTH CONVERSION AND LASER SOURCE

(71) Applicant: KM Labs Inc., Boulder, CO (US)

(72) Inventors: Matthew S. Kirchner, Westminster, CO (US); Sterling J. Backus, Boulder, CO (US); David Winters, Erie, CO (US); Scott R Domingue, Boulder, CO (US)

(73) Assignee: Kapteyn Murnane Laboratories, Inc., Boulder, CO (US)

( * ) Notice: Subject to any disclaimer, the term of this patent is extended or adjusted under 35 U.S.C. 154(b) by 0 days.

(21) Appl. No.: 15/892,307

(22) Filed: Feb. 8, 2018

(65) Prior Publication Data

US 2018/0224710 A1    Aug. 9, 2018

Related U.S. Application Data

(60) Provisional application No. 62/456,248, filed on Feb. 8, 2017.

(51) Int. Cl.
| *G02F 1/35* | (2006.01) |
| *G02F 1/39* | (2006.01) |
| *H01S 3/00* | (2006.01) |
| *H01S 3/02* | (2006.01) |

(52) U.S. Cl.
CPC ........... *G02F 1/353* (2013.01); *G02F 1/39* (2013.01); *H01S 3/0085* (2013.01); *G02F 2001/392* (2013.01); *H01S 3/0071* (2013.01); *H01S 3/0092* (2013.01); *H01S 3/02* (2013.01)

(58) Field of Classification Search
CPC . H01S 3/0085; H01S 1/0092; G02F 2001/392
See application file for complete search history.

(56) References Cited

U.S. PATENT DOCUMENTS

| 5,754,333 | A | * | 5/1998 | Fulbert | G02F 1/39 |
| | | | | | 359/330 |
| 6,680,956 | B2 | * | 1/2004 | Gerstenberger | G02B 6/124 |
| | | | | | 372/20 |
| 7,039,087 | B2 | * | 5/2006 | Nettleton | H01S 3/0606 |
| | | | | | 372/10 |
| 7,394,841 | B1 | * | 7/2008 | Konttinen | G02F 1/3501 |
| | | | | | 372/21 |
| 8,144,311 | B2 | * | 3/2012 | Eno | G01B 11/026 |
| | | | | | 356/3.01 |
| 8,410,507 | B2 | * | 4/2013 | Stauss | H01L 25/0753 |
| | | | | | 257/98 |
| 9,076,952 | B2 | * | 7/2015 | Saito | H01L 33/642 |
| 9,608,402 | B2 | * | 3/2017 | Gao | H01S 5/02212 |
| 9,726,340 | B2 | * | 8/2017 | Seko | F21S 48/125 |
| 2007/0195538 | A1 | * | 8/2007 | Hama | G02B 6/0003 |
| | | | | | 362/382 |
| 2007/0237191 | A1 | * | 10/2007 | Kafka | H01S 3/2308 |
| | | | | | 372/20 |

(Continued)

*Primary Examiner* — Rhonda S Peace
(74) *Attorney, Agent, or Firm* — Macheledt Bales LLP; Jennifer L. Bales

(57) ABSTRACT

An integrated, vertically stacked device includes a laser in an enclosure, a wavelength converter in an enclosure, a mechanical interface for attaching the enclosures and maintaining the laser and wavelength converter in the same plane, and apparatus for directing light from the laser to the wavelength converter within the footprint of the integrated device.

22 Claims, 3 Drawing Sheets

(56) References Cited

U.S. PATENT DOCUMENTS

| | | | |
|---|---|---|---|
| 2013/0279170 A1* | 10/2013 | Yokoyama | H01S 5/0092 362/259 |
| 2015/0372200 A1* | 12/2015 | Seko | F21S 48/125 362/510 |
| 2016/0131314 A1* | 5/2016 | Waragaya | H01S 5/005 362/538 |
| 2016/0268770 A1* | 9/2016 | Tazawa | H01S 5/0092 |
| 2018/0224710 A1* | 8/2018 | Kirchner | G02F 1/353 |

* cited by examiner

KINEMATIC MOUNTING

HARD MOUNTING

INTEGRATED WAVELENGTH CONVERSION AND LASER SOURCE

BACKGROUND OF THE INVENTION

Field of the Invention

The present invention relates to methods and apparatus for generating highly stable wavelength-tunable light through mechanical coupling and integration of a vertically stacked wavelength converter, and the laser that drives the wavelength converter.

Discussion of Related Art

Current solutions to wavelength conversion or wavelength-tunable light generation:
1. A laser is placed on an optical breadboard or platform along with wavelength conversion setup. The light is transmitted to the wavelength conversion setup through free space or in beam tubes.
2. A laser is placed on an optical breadboard along with a wavelength conversion setup in a common exterior enclosure. This enclosure surrounds both the original laser system and the wavelength conversion setup elements.
3. The laser system and wavelength conversion are integrated into a common laser platform and enclosure at the factory. While this is the most stable arrangement, purchasing the laser and wavelength conversion separately or in phases is difficult since the sources are built in the same box.

A need remains in the art for an integrated, vertically stacked device including a laser, a wavelength converter, a mechanical interface for maintaining the laser and wavelength converter in the same plane, and apparatus for directing light from the laser to the wavelength converter within the footprint of the integrated device.

SUMMARY

It is an object of the present invention to provide an integrated, vertically stacked device including a laser, a wavelength converter, a mechanical interface for maintaining the laser and wavelength converter in the same plane, and apparatus for directing light from the laser to the wavelength converter within the footprint of the integrated device.

The present invention relates to methods and apparatus for generating highly stable wavelength-tunable light through mechanical coupling and integration of a laser with a wavelength converter, such as a harmonic generator (HG) setup, a nonlinear compression (NC) setup, a nonlinear broadening (NB) setup, a four-wave mixing (FWM) setup, a high harmonic generation (HHG) setup, an optical parametric oscillator (OPO), or an optical parametric amplifier (OPA). Such wavelength conversion devices are highly important in a variety of scientific, medical, and industrial fields because they allow the conversion of one wavelength of light, such as approximately 1.03 μm that is efficiently generated by Yb-doped gain medium, to other more application-relevant wavelengths (using nonlinear conversion techniques) that are not readily accessible via tradition laser electronic transitions. Such wavelength converters allow access to light from the soft X-ray to far infrared starting with a fixed-wavelength drive laser.

The laser and wavelength converter are vertically stacked to provide a stable platform while retaining the amount of optical table area (optical head footprint) consumed by the original laser system. This arrangement enables an easy route to adding wavelength tunability to an existing laser, as well as swapping between tunable wavelength output configurations with the same laser system.

The present inventors are focusing on producing highly reliable and reconfigurable laser products for a wide range of scientific, medical, and industrial applications. Towards this end, the present invention provides an approach where a highly stable laser is produced with mechanical features that enable rigid or kinematic mounting of a secondary enclosure or multiple enclosures containing a wavelength conversion setup or combinations of such for generating different wavelength light from the original laser. This invention makes it easy for the laser user to upgrade to different wavelength light sources after having purchased the initial laser, while maintaining the robustness, stability, and footprint of the original laser platform. In addition, this invention can make it easy for a user to change between different wavelengths by changing the upper wavelength conversion setup. The invention provides for rigid or kinematic mechanical references between the laser and wavelength conversion setup, giving enhanced stability over other methods that rely on secondary enclosures bolted to a common optical platform such as an optical table or optical breadboard. This invention allows for a reduction in footprint and efficient usage of valuable optical table space, which is realized by vertically stacking the laser and wavelength conversion setup into a common package that retains the footprint of the original laser optical head.

DETAILED DESCRIPTION OF THE PREFERRED EMBODIMENTS

Figure 1:
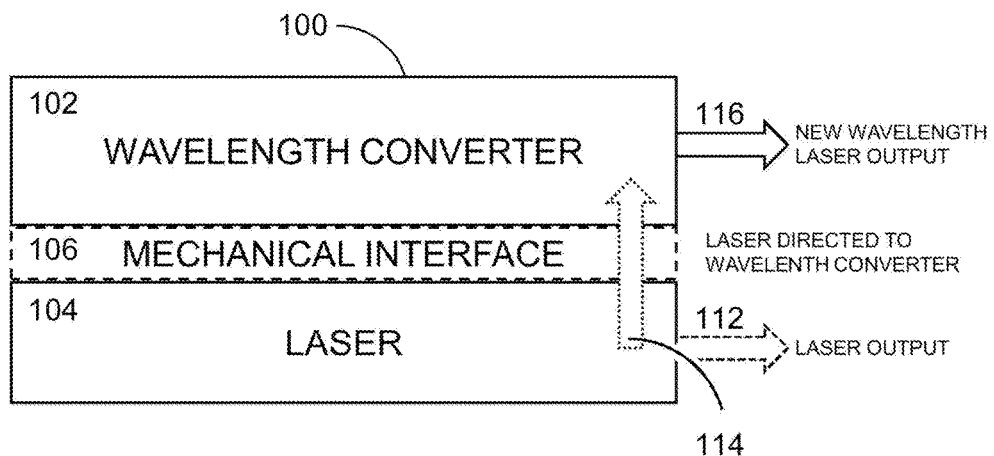
FIG. 1 is a side schematic block diagram of a general embodiment of the present invention comprising a vertically stacked, integrated wavelength conversion and laser source.
Figure 2:
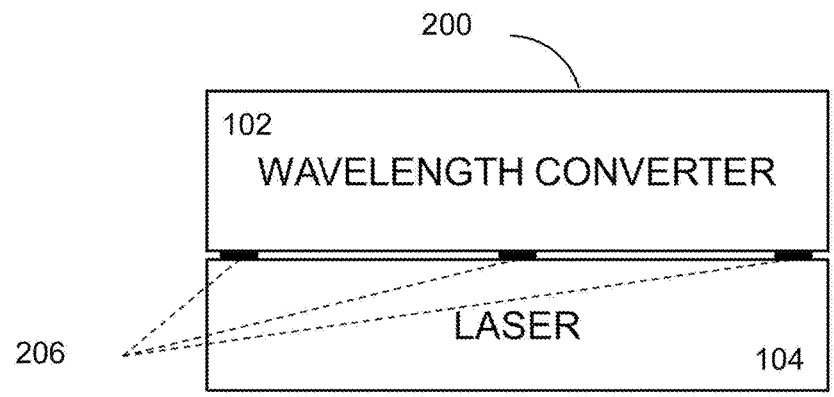
FIG. 2 is a side schematic block diagram of an example of the vertically stacked, integrated wavelength conversion and laser source of FIG. 1.
Figure 4:
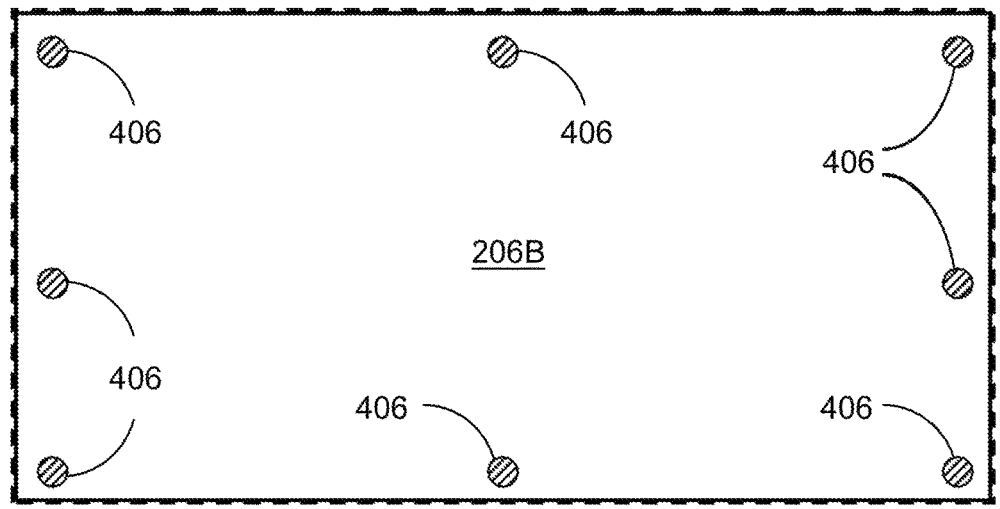
FIG. 4 is a top cutaway view of the present invention showing an embodiment of hard mounting.
Figure 5:
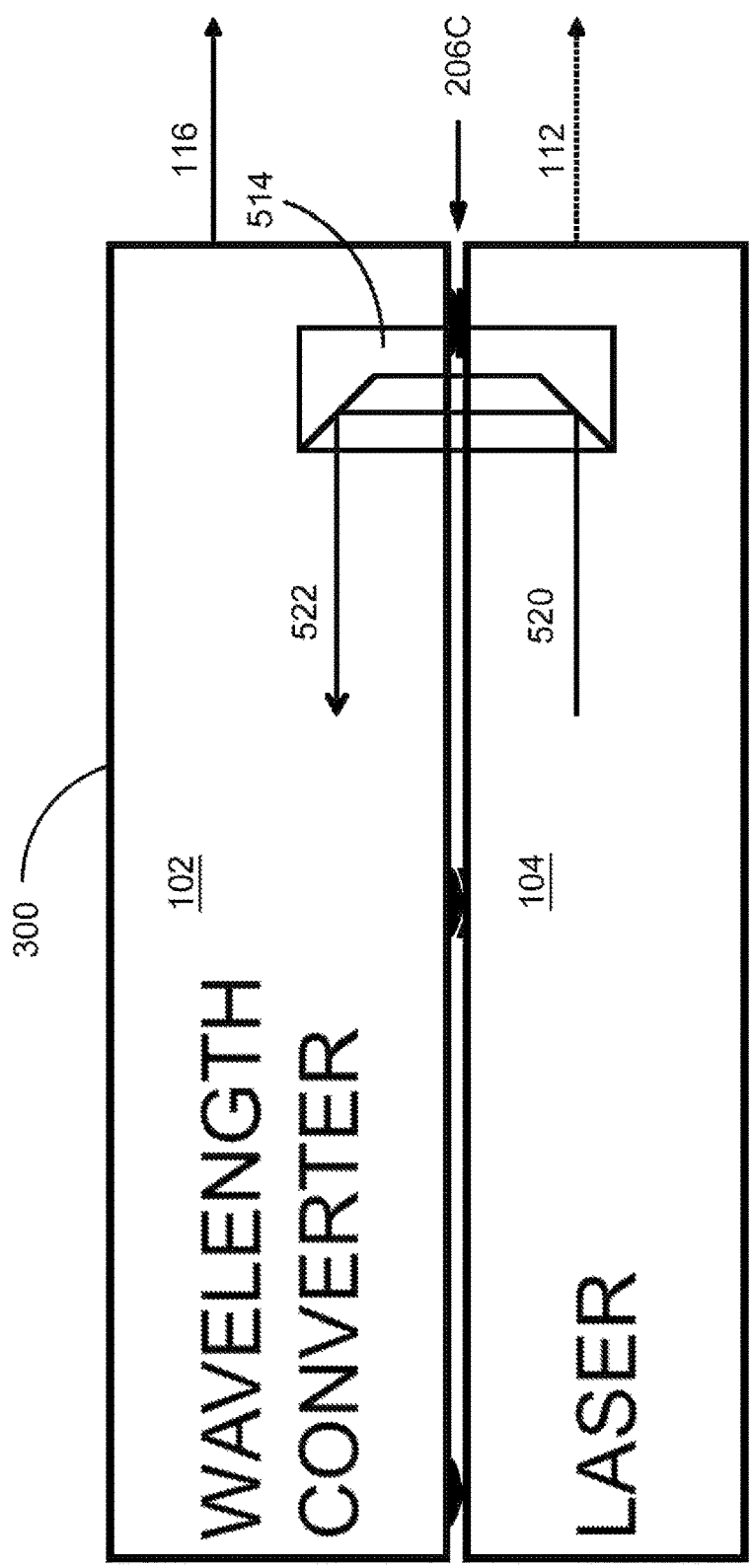
FIG. 5 Is a side schematic diagram of another embodiment of the vertically stacked, integrated wavelength conversion and laser source of FIGS. 1 and 2 using an internal beam periscope.

The present invention enables the addition of wavelength converting element 102 to laser element 104 while maintaining the optical head footprint and maximizing stability between the two elements by forming an integrated device 100, 200, 300 (see FIGS. 1, 2, and 5). A preferred embodiment of the invention consists of a commercial femtosecond laser 104 with attachment features 106 enabling the attachment of wavelength converting element 102, either before or after shipment of laser 104 to a consumer. In the case where the consumer retrofits an original laser element 104 with an additional wavelength converting element 102, the factory-installed top lid (not shown) is removed and replaced with wavelength converting element 102, with an interface such as those shown in FIGS. 3 and 4. The factory-installed lid attachment features can be reused to attach wavelength conversion element 102 to laser 104, hidden internal features can be used, or some combination of these can be used.

Figure 3:
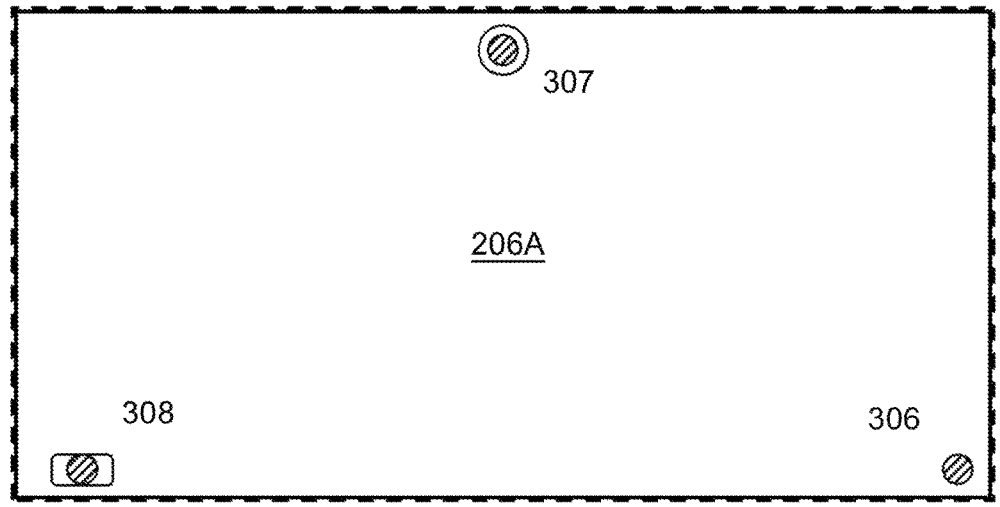
FIG. 3 is a top cutaway view of the present invention showing an embodiment of kinematic mounting.

Alignment pins (not shown) can be utilized to enable repeatable placement of the wavelength converting element with respect to the laser, or the structure of the mounting itself can be kinematic to ensure repeatable mounting, as shown in FIG. 3. A periscope 514 (see FIG. 5) attached to wavelength converting element 102 is placed in the original laser beam output path, directing the laser light 114 up to wavelength converting element 102, within the footprint of integrated device 100, 200, 300. From there, frequency conversion elements (not shown) such as harmonic generation elements (to include one or more of second harmonic generation, third harmonic generation, fourth harmonic generation, among others), a nonlinear pulse compression setup (consisting of spectral broadening and recompression), a nonlinear broadening setup (consisting of bulk or fiber broadening for generation of a broader output spectrum), a four-wave mixing (FWM) setup, a high harmonic generation (HHG) setup, an optical parametric oscillator, or an optical parametric amplifier convert the incident laser light into different wavelength region(s).

FIG. 1 is a side schematic block diagram of an embodiment 100 of the present invention. Laser 104 with initial output 112 is connected to wavelength converter element 102 via mechanical interface 106. Wavelength converter 102 is stacked vertically on top of laser 104 and fixed with respect to laser 104 by mechanical interface 106, which may be a kinematic mount (see FIG. 3) or a hard mount (see FIG. 4). Laser 104 contains optical elements (not shown) which redirect laser light 114 from laser 104 to wavelength converter 102 within the footprint of vertically stacked, integrated wavelength conversion and laser source 100 for conversion to new wavelengths. Converted light 116 is output for use by a laser operator.

FIG. 2, FIG. 3, and FIG. 4 show embodiments of the mechanical attachment methods for stable and robust mounting of the wavelength converting element to the laser. A series of three or more attachment points are made between the elements. FIG. 2 shows mechanical interface 206 consisting of three or more kinematic or hard attachment points between the laser and wavelength converter.

FIG. 3 is a top view of an embodiment of kinematic mounting 206A where wavelength converter 102 and laser 104 are attached to each other (as shown in FIGS. 1 and 2) via one fixed hole 306, one slot 308, and one loose fit hole 307 to constrain top wavelength converter 102 to be in the plane of bottom laser 104, regardless of deflections due to temperature changes. Alternate kinematic mounting schemes include rigid spherical surfaces interfacing with a cone or triangle in the first mounting position, a slot in the second mounting position, and a plane in the third mounting position, or other so-called "kinematic" mounting arrangements.

FIG. 3 shows a top down view of one kinematic mounting method, where the attachment points are constrained based on the location. In the preferred embodiment, the location nearest the output of the laser (and closest to the beam transfer position between the top and bottom housings) is a fixed point 306, constrained in all three dimensions (X, Y, Z) via firm attachment to the laser with a bolt or similar hardware. The location parallel to this attachment point is constrained in a groove 308 in two dimensions (X, Z), where the slot allows the housings to move relative to each other in one dimension (Y). The third attachment point is constrained only in the Z dimension by a loose-fitting hole 307. Typically, Z-registration is ensured via firm but compliant mounting attachment using devices such as springs, wave washers, compliant washers, or the like. An alternate configuration to slotted and relieved bolt holes uses spherical contacts such as tooling balls in one of the housings, and a cone or triangle contact (fixed in X, Y, Z), a slot or rail contact (fixed in X and Z), and a flat plate or plane contact (fixed in Z). See FIG. 5, 206C. Again, force is applied via a compliant mounting method to keep the tooling balls registered in the cone, slot, and plane. This mounting arrangement minimizes stresses that occur due to change in temperature or operational parameters in the laser or wavelength converter. This mounting method will reduce the variability of input pointing of the laser light into the wavelength conversion element and will ensure stable operation of the wavelength conversion at a variety of temperatures and operational conditions. The kinematic mounting arrangement also puts a minimum amount of stress on both mechanical housings so that they are not deformed.

FIG. 4 is a top view of an embodiment of hard mounting 406 where eight firm attachment points are used to constrain top wavelength converter 102 to be in the plane of bottom laser 104.

FIG. 4 is an example of a hard mounting configuration where the wavelength converter element is firmly attached to the laser in three or more places. This configuration can rigidly constrain the two elements to move in concert, enhancing stability in some configurations. Generally the kinematic attachment methods are preferred because of the reduced mechanical and thermal stress generally leads to more stable laser and wavelength converter performance.

FIG. 5 shows an embodiment of vertically stacked, integrated wavelength conversion and laser source 300 including internal beam periscope 514 for intercepting the output from laser 104 and directing it into wavelength converter 102 within the footprint of integrated device 300 using an internal beam periscope 514.

FIG. 5 shows a method for transferring laser light 520 from the inside of the laser 104 enclosure to the inside of the wavelength converter 102 enclosure (as light 522). It utilizes a periscope 514 that is mounted to either the laser 104 or wavelength converter 102 mechanical housing. In a preferred embodiment, periscope 514 is monolithic and contains no adjustable mirrors and is attached firmly to the wavelength converter 102 enclosure. This arrangement maximizes the stability of the light transfer from laser 104 to wavelength converter 102 and allows for the wavelength converter to be removed easily, enabling laser 104 to function as it did before wavelength conversion element 102 was attached. This approach also allows for multiple types of wavelength conversion elements to be configured for use with the same laser 104, enabling fast swapping of the output capabilities of the system. An alternate approach involves using a mirror (not shown) fixed to the laser 104 enclosure to direct the light up to a mirror (not shown) mounted on the wavelength convertor 102 enclosure.

Once the light 522 from laser 100 is in the wavelength conversion enclosure, a plurality of optical elements (not shown) converts the light to different wavelength regions. These elements are typically beamsplitters, waveplates, polarizers, lenses, dichroic separators and combiners, optical mirrors, crystals or optical glasses for nonlinear broadening and supercontinuum generation, and nonlinear crystals. Apertures or irises (not shown) can be used to check the alignment of the laser light within the wavelength conversion enclosure. Once light 522 is converted to the new wavelength or wavelengths, the converted light 116 is output from the wavelength converter element 102 through an aperture (not shown), or back into the laser 104 enclosure and out the original laser output aperture (not shown).

One particularly useful embodiment utilizes an ultrafast fiber laser as the laser component 104. Generally in such fiber lasers, the final amplifier element is a fiber with a large minimum bend diameter, which generally defines the minimum size of the laser system along at least one dimension and forms the horizontal plane of the laser enclosure. The wavelength converter 102, such as a parametric amplifier, shares roughly the same footprint as the laser in this invention, and is configured such that the plane of the parametric amplifier is substantially parallel to the plane of the laser defined by the fiber amplifier fiber bend geometry.

Features of the Invention include:
1. Interchangeable wavelength conversion 102 enclosures of different configurations such that the laser can be equipped with any one or more of these wavelength conversion configurations.
2. Mechanical attachments 106 enable rapid swapping between different configurations with accurate mechanical references enabling repeatable optical alignment for the wavelength conversion elements.
3. Size and form factor: An integrated housing approach gives the smallest possible optical head footprint while only increasing the height of the optical arrangement. Generally, footprint is the limiting factor in optical applications, and the smaller the footprint, the better.
4. Retrofittability/reconfigurability: This invention enables a laser to be retrofitted after manufacture to change the wavelength to a different region and/or the pulse duration to a different value according to the customer desires.
5. Manufacturability: A common laser platform can be used for multiple purposes and applications, meaning the common laser can be manufactured in higher volume, enabling cost savings.

What is claimed is:

1. A vertically integrated device comprising:
   a laser within a laser enclosure;
   a wavelength converter for providing coherent output light within a wavelength converter enclosure, the wavelength converter enclosure stacked on top of the laser enclosure substantially within the footprint of the laser enclosure;
   a kinematic mounting interface configured to maintain the laser and the wavelength converter in substantially parallel planes; and
   a transfer device configured to transfer light from the laser to the wavelength converter within the footprint of the laser enclosure;
   wherein the kinematic mounting interface is configured to maintain the laser and the wavelength converter in an orientation that allows the wavelength converter to provide coherent output light based upon the light from the laser.

2. The integrated device of claim 1 wherein the kinematic mounting comprises a connection point constrained in three dimensions, a connection point constrained in two dimensions, and a connection point constrained in one dimension.

3. The integrated device of claim 2 wherein the connection point constrained in one dimension comprises an attachment loosely fitted to a hole.

4. The integrated device of claim 2 wherein the connection point constrained in one dimension comprises a spherical contact and a plane.

5. The integrated device of claim 2 wherein the connection point constrained in two dimensions comprises an attachment closely fitted to a slot.

6. The integrated device of claim 2 wherein the connection point constrained in two dimensions comprises a spherical contact and a rail.

7. The integrated device of claim 2 wherein the connection point constrained in three dimensions comprises an attachment closely fitted to a hole.

8. The integrated device of claim 2 wherein the connection point constrained in three dimensions comprises a spherical contact and cone.

9. The integrated device of claim 1 wherein the transfer device comprises a periscope.

10. The integrated device of claim 9 wherein the periscope is monolithic and includes no adjustable mirrors.

11. The integrated device of claim 9 wherein the periscope is attached to the wavelength converter enclosure.

12. The integrated device of claim 9 wherein the periscope includes adjustable mirrors.

13. The integrated device of claim 9 wherein the periscope is attached to the laser.

14. The integrated device of claim 1 wherein the laser comprises a femtosecond laser.

15. The integrated device of claim 1 wherein the wavelength converter comprises one of the following: a harmonic generator a nonlinear pulse compression setup, a nonlinear broadening setup, a four-wave mixing (FWM) setup, a high harmonic generation (HHG) setup, an optical parametric oscillator, or an optical parametric amplifier.

16. The integrated device of claim 1 wherein the laser comprises an ultrafast fiber laser having a final amplifier element comprising a fiber which defines the minimum size of the laser system along at least one dimension forming a laser plane; wherein the wavelength converter comprises a parametric amplifier forming a converter plane; and wherein the laser plane is substantially parallel to the converter plane.

17. A vertically integrated device comprising:
    a laser within a laser enclosure;
    a wavelength converter for providing coherent output light within a wavelength converter enclosure, the wavelength converter enclosure stacked on top of the laser enclosure substantially within the footprint of the laser enclosure;
    a kinematic mounting interface configured to maintain the laser and the wavelength converter in substantially parallel planes, the kinematic mounting interface including a connection point constrained in three dimensions, a connection point constrained in two dimensions, and a connection point constrained in one dimension; and
    a transfer device configured to transfer light from the laser to the wavelength converter within the footprint of the laser enclosure;
    wherein the kinematic mounting interface is configured to maintain the laser and the wavelength converter in an orientation that allows the wavelength converter to provide coherent output light based upon the light from the laser.

18. The vertically integrated device of claim 17 wherein the kinematic mounting interface includes a spherical contact engaged with a plane, a spherical contact engaged with a rail, and spherical contact engaged with a tapered surface.

19. The vertically integrated device of claim 18 wherein the laser comprises an ultrafast fiber laser having a final amplifier element comprising a fiber which defines the minimum size of the laser system along at least one dimension forming a laser plane; wherein the wavelength converter comprises a parametric amplifier forming a converter plane; and wherein the laser plane is substantially parallel to the converter plane.

20. The vertically integrated device of claim 19 wherein the transfer device comprises a monolithic periscope having no adjustable mirrors.

21. The vertically integrated device of claim 18 wherein the tapered surface is a cone.

22. The vertically integrated device of claim 17 wherein the kinematic mounting interface includes a rigid connection device engaged with a loosely fitted hole, a rigid connection device engaged with a closely fitted hole, and a rigid connection device engaged with a slot.

\* \* \* \* \*